United States Patent
Cha et al.

(10) Patent No.: US 9,346,412 B2
(45) Date of Patent: May 24, 2016

(54) BICYCLE CARRIER APPARATUS FOR VEHICLE

(71) Applicant: Hyundai Motor Company, Seoul (KR)

(72) Inventors: Dong Eun Cha, Suwon-si (KR); Hyun Gyung Kim, Hwaseong-si (KR); Jin Young Yoon, Gimpo-si (KR); Seung Mok Lee, Osan-si (KR); Soo Hyun Hyun, Gyeongju-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/562,419

(22) Filed: Dec. 5, 2014

(65) Prior Publication Data

US 2016/0096483 A1    Apr. 7, 2016

(30) Foreign Application Priority Data

Oct. 6, 2014  (KR) .......................... 10-2014-0134004

(51) Int. Cl.
 *B60R 9/06* (2006.01)
 *B60R 9/10* (2006.01)

(52) U.S. Cl.
 CPC .... *B60R 9/10* (2013.01); *B60R 9/06* (2013.01)

(58) Field of Classification Search
 CPC .................................... B60R 9/06; B60R 9/10
 See application file for complete search history.

(56) References Cited

U.S. PATENT DOCUMENTS

| 7,909,213 B2 * | 3/2011 | Bergerhoff ................ B60R 9/10 224/197 |
| 8,302,829 B2 * | 11/2012 | Lee ........................... B60R 9/06 224/488 |
| 9,039,263 B2 * | 5/2015 | Hofmann .................. B60R 9/10 362/549 |
| 2008/0142559 A1 | 6/2008 | Lim |
| 2011/0002763 A1 * | 1/2011 | Earl ........................ B60P 1/431 414/523 |

FOREIGN PATENT DOCUMENTS

| DE | 10-2004-021-709 A1 * | 12/2005 | ................ B60R 9/10 |
| DE | 10-2012-002-261 A1 * | 8/2013 | ................ B60R 9/10 |
| DE | 20-2013-004-234 U1 * | 9/2014 | ................ B60R 9/06 |
| KR | 10-2011-0010877 A | 2/2011 | |
| KR | 10-2011-0034733 A | 4/2011 | |
| KR | 10-2011-0035378 A | 4/2011 | |
| KR | 10-2011-0050162 A | 5/2011 | |
| KR | 10-1154526 B1 | 6/2012 | |

* cited by examiner

*Primary Examiner* — Gary Elkins
(74) *Attorney, Agent, or Firm* — Morgan, Lewis & Bockius LLP

(57) ABSTRACT

A bicycle carrier apparatus for a vehicle may include guide rails disposed at a lower portion of a bumper back beam while being symmetrical to each other and extendely formed in front and rear directions, a carrier part provided with a panel part and side portions extending from both sides of the panel part to the guide rails to slidably move along the guide rails, a first driving part installed at a front end portion of the carrier part and connected to the guide rails to move the carrier part in the front and rear directions along the guide rails, an expansion support part installed between the side portions of the carrier part to be expandably deployed laterally and support a loaded bicycle, and a second driving part installed at the carrier part to be connected to the expansion support part and expandably deploy the expansion support part.

14 Claims, 9 Drawing Sheets

BICYCLE CARRIER APPARATUS FOR VEHICLE

CROSS REFERENCE TO RELATED APPLICATION

The present application claims priority of Korean Patent Application Number 10-2014-0134004 filed on Oct. 6, 2014, the entire contents of which application are incorporated herein for all purposes by this reference.

BACKGROUND OF THE INVENTION

1. Field of the Invention

The present invention relates to a bicycle carrier apparatus for a vehicle in which the carrier is configured to be received in a bumper back beam at ordinary times, drawn out to the outside when a bicycle is loaded, and tilted in the drawn out state, in the carrier which is installed in a rear bumper of a vehicle to load a bicycle and luggage.

2. Description of Related Art

Recently, as a bicycle is used as a leisure means, the bicycle is loaded in a vehicle to move the bicycle to a bicycle lane or near the mountains.

However, the bicycle generally has a large volume and therefore even though a trunk or a back seat room of the vehicle is used, it is difficult to load the bicycle.

To solve the above problem, various methods for loading a bicycle outside the vehicle have been proposed, but in the case of a method of fixing and loading a bicycle in a roof panel of the vehicle, a loading work itself is very inconvenience and a height of the vehicle is increased, such that the bicycle is locked when entering a tunnel or a building, thereby causing safety accidents.

A method of loading a bicycle in a back portion of a tail gate of the vehicle may cause an inconvenience to install a separate carrier apparatus in the tail gate and ruin an appearance design due to the exposure of the carrier apparatus to the outside even at ordinary times when the bicycle is not loaded.

Further, since when the bicycle needs to be loaded, the carrier apparatus is installed and when the bicycle need not be loaded, an inconvenience to again separate the carrier occurs, convenience results in insufficiency.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a bicycle carrier apparatus for a vehicle capable of maintaining an appearance design and improving convenience at ordinary times, by installing a bicycle carrier at a bumper back beam of a rear portion of the vehicle to prevent the bicycle carrier from being exposed to the outside at ordinary times and drawing out the bicycle carrier from the bumper back beam when the loading of the bicycle is required to load the bicycle.

In an aspect of the present invention, a bicycle carrier apparatus for a vehicle, may include guide rails disposed at a lower potion of a bumper back beam while being symmetrical to each other and extendely formed in front and rear directions, a carrier part provided with a panel part and provided with side portions extending from both sides of the panel part to the guide rails to slidably move in the front and rear directions along the guide rails, a first driving part installed at a front end portion of the carrier part and connected to the guide rails to move the carrier part in the front and rear directions along the guide rails, an expansion support part installed between the side portions of the carrier part to be expandably deployed laterally and support a loaded bicycle, and a second driving part installed at the carrier part to be connected to the expansion support part and expandably deploy the expansion support part.

The first driving part may include a first motor part transferring rotation power, and a moving link part extending from the first motor part toward the side portions, make extending ends be connected to the guide rails, and making the carrier part slidably move in the front and rear directions along the guide rails when the first motor part is operated.

The extending ends of the moving link part are provided with pinion gears and the guide rails are provided with rack gears extending in the front and rear directions to be meshed with the pinion gears.

The expansion support part may include an expansion rail extending to cross the side portions of the carrier part to be fixed to the side portions, a loading part slidably moving along the expansion rail, and an expansion link part extending in parallel with the expansion rail, being movably connected along a direction in which the loading part extends, and being connected to the second driving part to move the loading part along the expansion rail at a time of the operation of the second driving part.

The loading part may include a moving member connected to the expansion link part to move along a direction in which the expansion link part extends at a time of the operation of the second driving part and a support member extending laterally from the moving member to support a wheel of the bicycle.

The expansion link part is configured as a lead screw and is screw-connected to one side end of the moving member by penetrating through the moving member.

The expansion rail is provided with a guide groove along the extending direction and the support member is provided with a sliding part inserted into the guide groove to slidably move along the guide groove.

The second driving part may include a second motor part transferring rotation power, and a rotation part extending laterally from the second motor part to be connected to the expansion link part and rotate in the front and rear directions at a time of the operation of the second motor part to transfer the rotation power to the expansion link part.

The expansion link part is provided with a rotation connection part connected to the rotation part to receive the rotation power of the second motor part.

The rotation part of the second driving part and the rotation connection part of the expansion link part are provided with a gear mutually meshed with an outer circumferential surface.

The guide rails are provided with first solenoid parts selectively connected to the side portions of the carrier part to selectively permit the sliding movement of the carrier part.

The guide rails are provided with a fixing bracket fixedly installed to a rear end portion thereof and a tilting bracket positioned at a rear portion of the fixing bracket to be rotatably installed at the bumper back beam.

The fixing bracket is provided with a second solenoid part selectively connected to the tilting bracket to selectively permit the rotation operation of the tilting bracket.

The side portion of the carrier part is rotatably provided with a fixing bar and is provided with a fixing member fixing the rotation position of the fixing bar.

Other detailed matters of the present invention are included in the detailed description and the accompanying drawings.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
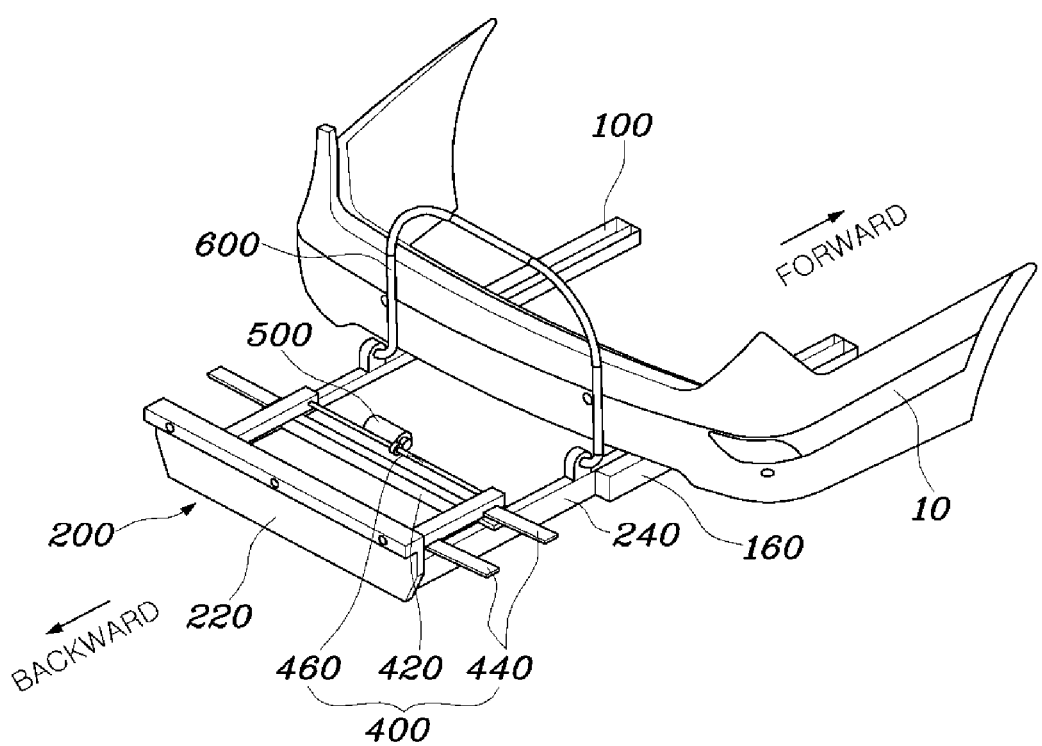
FIG. 1 is a perspective view of a bicycle carrier apparatus for a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, a bicycle carrier apparatus for a vehicle according to exemplary embodiments of the present invention will be described with reference to the accompanying drawings.

Figure 2:
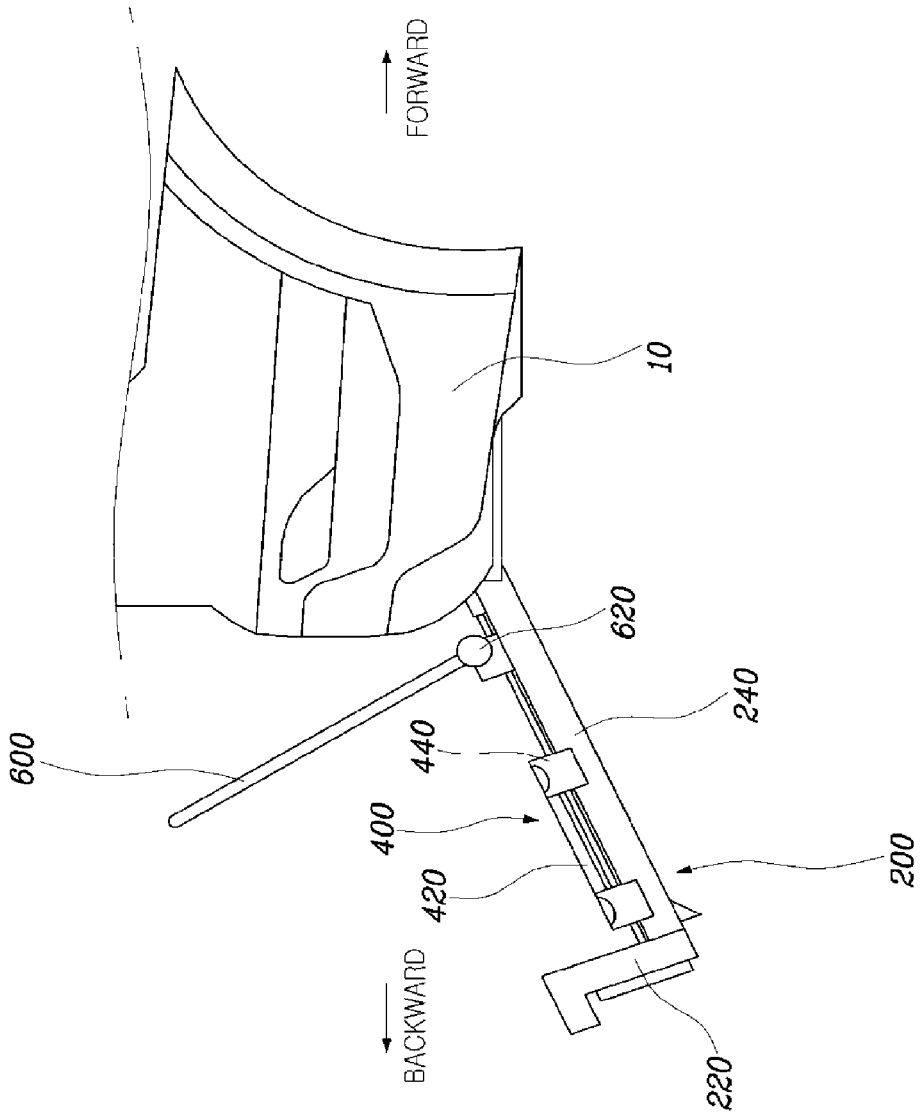
FIG. 2 is a diagram illustrating a tilting operation of the bicycle carrier apparatus for a vehicle illustrated in FIG. 1.

FIG. 1 is a perspective view of a bicycle carrier apparatus for a vehicle according to an exemplary embodiment of the present invention, FIG. 2 is a diagram illustrating a tilting operation of the bicycle carrier apparatus for a vehicle illustrated in FIG. 1, and FIGS. 3 to 9 are diagrams for describing the bicycle carrier apparatus for a vehicle illustrated in FIG. 1.

A bicycle carrier apparatus for a vehicle according to the exemplary embodiment of the present invention includes guide rails 100 configured to be disposed at a lower portion of a bumper back beam 10 while being symmetrical to each other and extendedly formed in a front and rear direction, a carrier part 200 configured to be provided with a panel part 220 and provided with side portions 240 extending from both sides of the panel part 220 to the guide rails 100 to slidably move in the front and rear direction along the guide rails 100, a first driving part 300 configured to be installed at a front end portion of the carrier part 200 and connected to the guide rails 100 to move the carrier part 200 in the front and rear direction along the guide rail 100, an expansion support part 400 configured to be installed between the side portions 240 of the carrier part 200 to be expandably deployed laterally and support a loaded bicycle, and a second driving part 500 configured to be installed at the carrier part 200 to be connected to the expansion support part 400 and expandably deploy bilaterally the expansion support part 400.

The bicycle carrier according to the exemplary embodiment of the present invention may be installed at the bumper back beam 10 of the rear portion of the vehicle and may be configured to be drawn out or received from or in the bumper back beam 10 or to be drawn out or received from or in the lower portion of the bumper back beam 10. Further, the expansion support part 400 which is expandably deployed laterally after the carrier part 200 is drawn out so as to load the bicycle is provided and the carrier part 200 is configured to be tilted, such that the bicycle carrier may be easily used.

Figure 3:
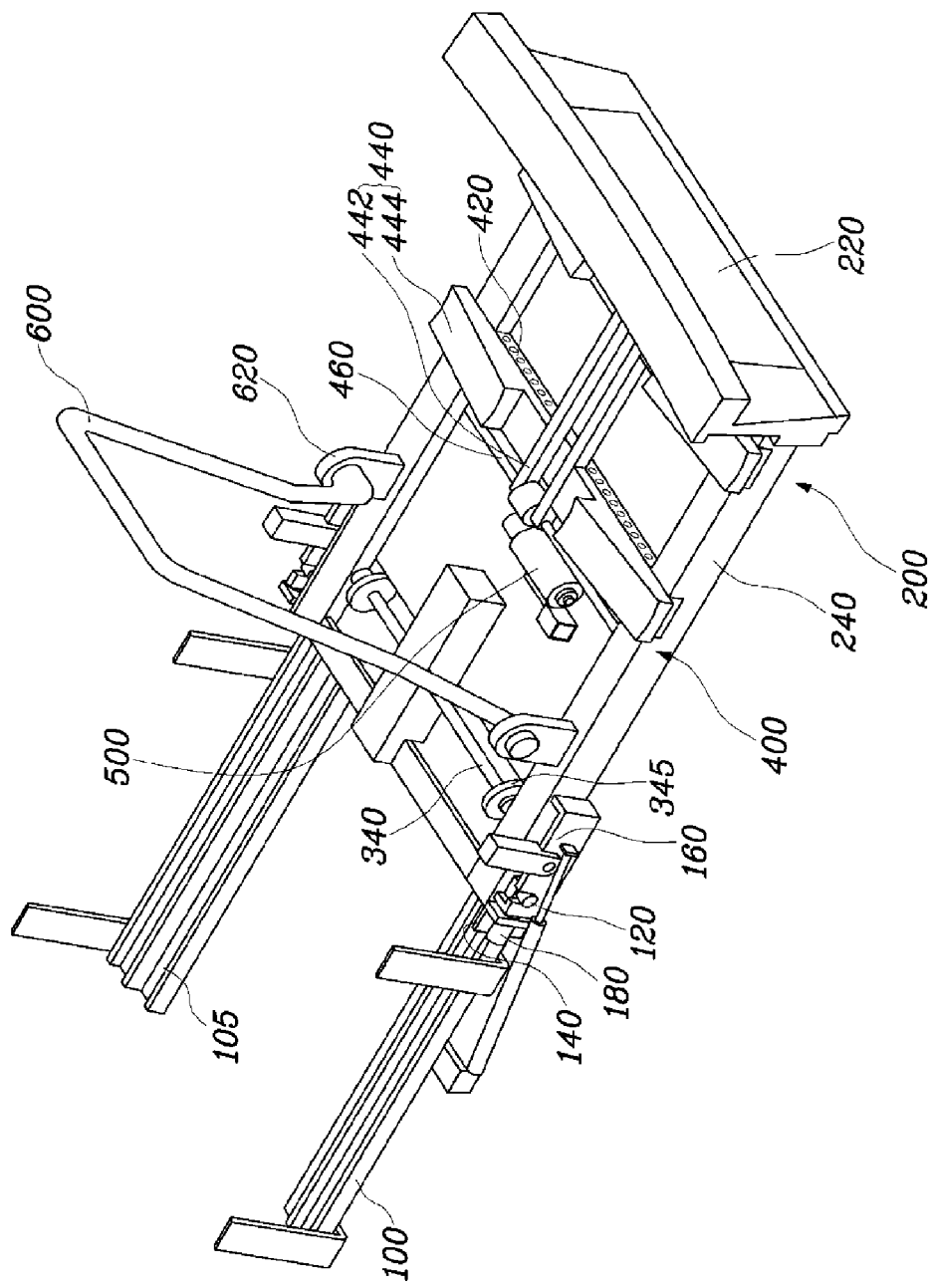
FIG. 3, FIG. 4, FIG. 5, FIG. 6, FIG. 7, FIG. 8 and FIG. 9 are diagrams for describing the bicycle carrier apparatus for a vehicle illustrated in FIG. 1.
Figure 4:
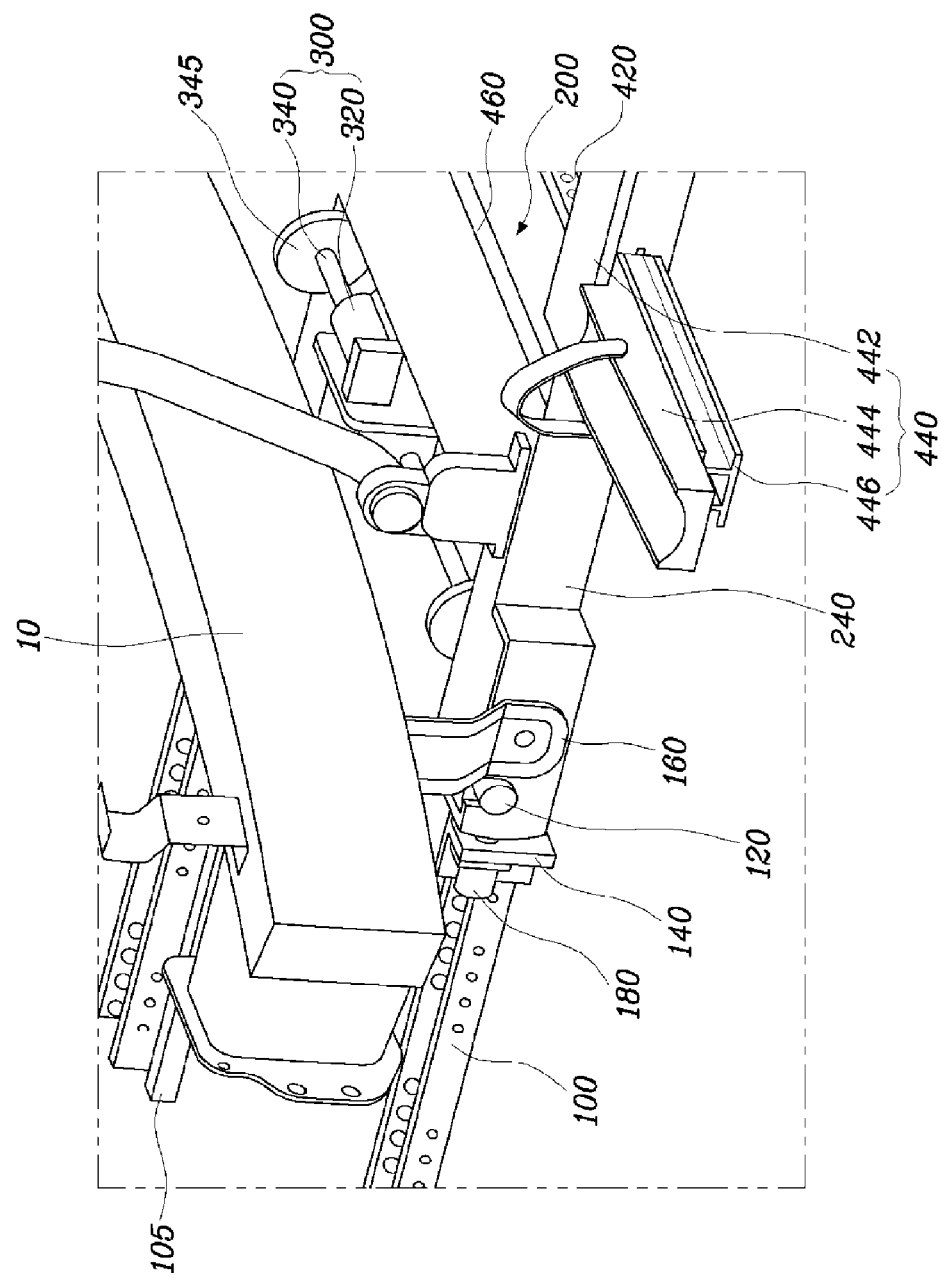

As illustrated in FIGS. 3 and 4, the guide rails 100 are fixedly provided at both sides of the lower portion of the bumper back beam 10 while being symmetrical to each other and are extendedly formed in the front and rear direction. That is, the carrier part 200 slidably moves along the guide rails 100 to be drawn out to the outside of the bumper back beam 10 or received in the bumper back beam 10.

Meanwhile, the carrier part 200 is provided with the panel part 220 forming the same surface as the bumper back beam 10 and the side portions 240 extending backward from the both side ends of the panel part 220 are connected to the guide rails 100. That is, the side portions 240 of the carrier part 200 move along the guide rails to perform the drawing out or receiving operation of the carrier part 200.

The carrier part 200 is provided with the first driving part 300 to move the carrier part 200 along the guide rails 100. The first driving part 300 may be disposed at a central portion of the front end portion of the carrier part 200.

In detail, the first driving part 300 may include: a first motor part 320 configured to transfer rotation power, and a moving link part 340 configured to extend from the first motor part 320 toward the side portions 240, make the extending ends be connected to the guide rails 100, and make the carrier part 200 slidably move in the front and rear direction along the guide rail 100 when the first motor part 320 is operated.

In this configuration, the extending ends of the moving link part 340 may be provided with pinion gears 345 and the guide rails 100 may be provided with rack gears 105 extending in the front and rear direction to be meshed with the pinion gears 345.

That is, the moving link part 340 extends from the first motor part 320 to both side portions 240 of the carrier part 200 to be rotatably installed when the first motor part 320 is operated. The extending ends of the moving link part 340 are provided with the pinion gears 345 meshed with the rack gears 105 formed at the guide rails, such that as the moving link part 340 rotates when the first motor part 320 is operated, the pinion gears 345 rotate and thus climb over the rack gears 105.

In addition to this, the guide rails 100 may be provided with first solenoid parts 120 configured to be selectively connected to the side portions 240 of the carrier part 200 to selectively permit the sliding movement of the carrier part 200. The first solenoid part 120 may be operated by interlocking with the first motor part 320 and when electricity is applied to the first solenoid part 120 at the time of the drawing out or receiving operation of the carrier part 200, the first solenoid part 120 is separated from the side portions 240 to permit the movement of the carrier part 200. To this end, the side portions 240 of the carrier part 200 may be provided with fixing grooves into which the first solenoid parts 120 may be inserted and the fixing groove may be positioned at a front end portion and a rear end portion of the side portion 240 so that the received state and the drawn out state of the carrier part 200 may be fixed.

Meanwhile, the carrier part 200 is provided with the expansion support part 400 configured to support a bicycle and the second driving part 500 configured so that the expansion support part 400 is deployed.

Figure 5:
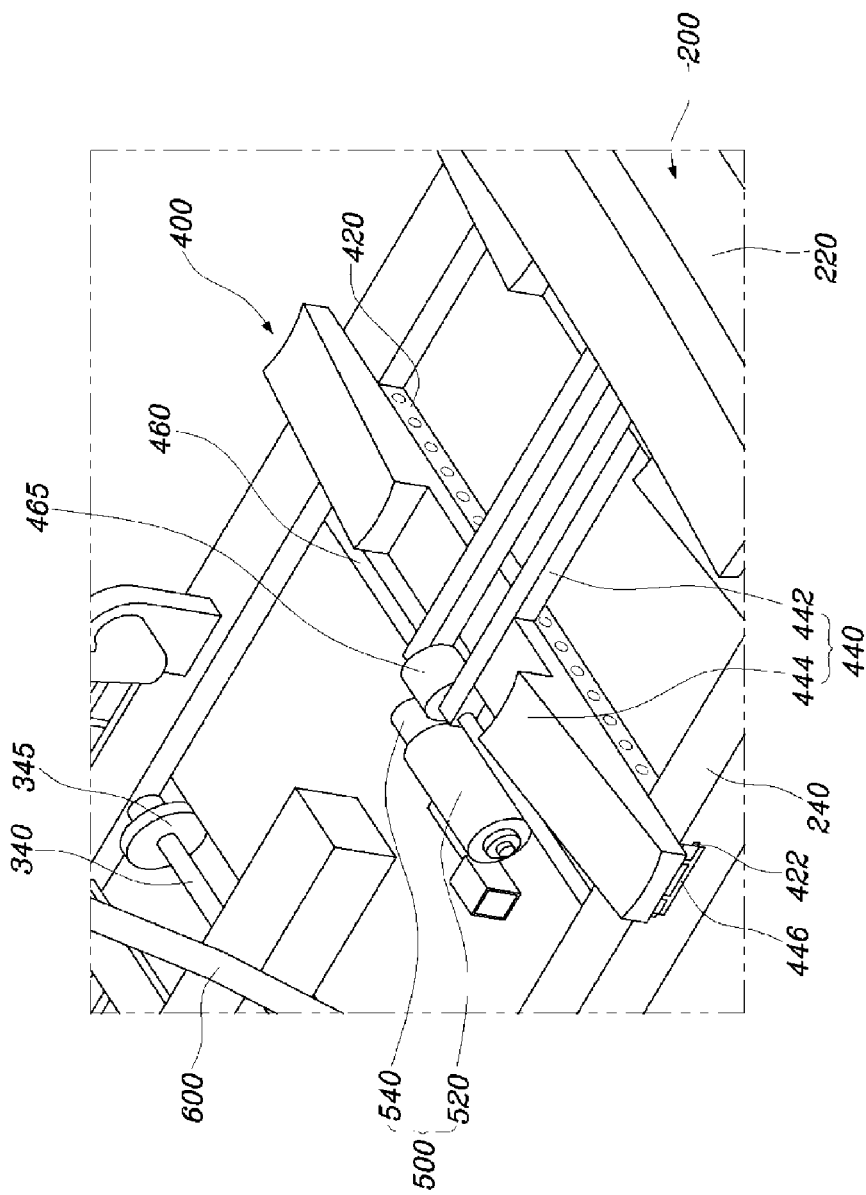
Figure 6:
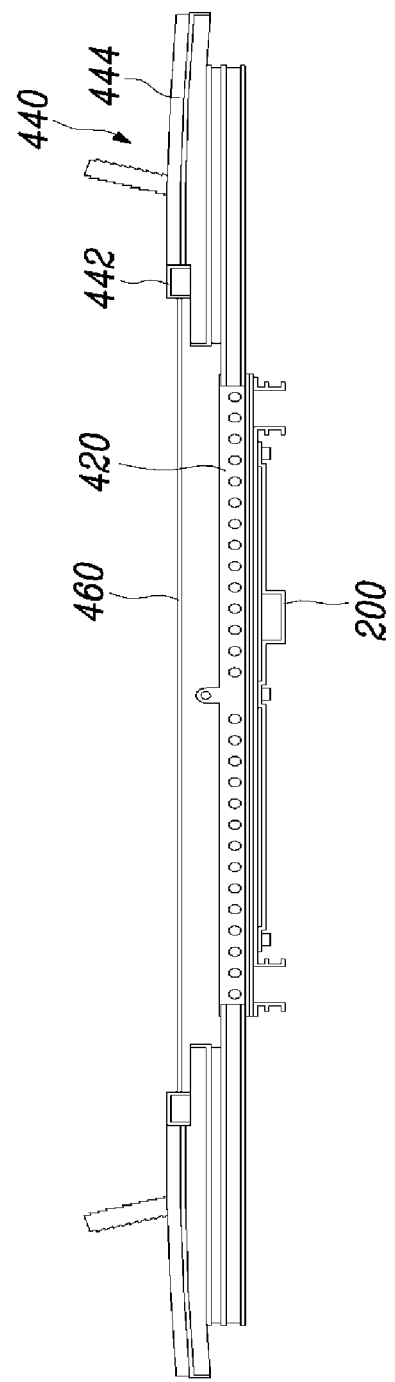
Figure 7:
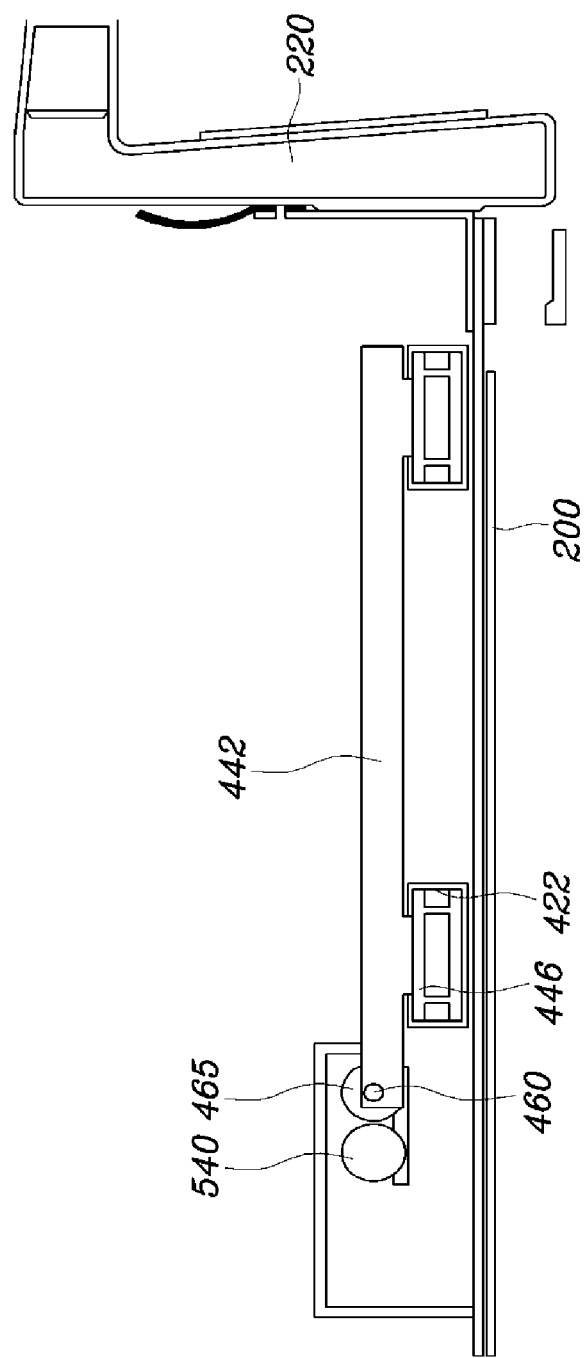

In detail, as illustrated in FIGS. 5 to 7, the expansion support part 400 may include: an expansion rail 420 configured to extend to cross the side portions 240 of the carrier part 200 so as to be fixed to the side portions 240, a loading part 440 configured to slidably move along the expansion rail 420, and an expansion link part 460 configured to extend in parallel with the expansion rail 420, be movably connected along a direction in which the loading part 440 extends, and be connected to the second driving part 500 to move the loading part 440 along the expansion rail 420 at the time of the operation of the second driving part 500.

That is, the expansion rail 420 of the expansion support part 400 is fixed crossing both side portions 240 of the carrier part 200. The expansion rail 420 is guided to move the loading part 440 laterally and is configured to secure sufficient rigidity, and thus may support a load of a bicycle even though the bicycle is loaded at the loading part 440.

Meanwhile, the loading part 440 may be configured in a pair so as to be symmetrical to both sides on a central line in the front and rear direction of the carrier part 200. By doing so, the loading part 440 is configured in a pair so as to be loaded bilaterally, such that the loading part 440 may be set to be fitted in a width of the bicycle.

The loading part 440 may include a moving member 442 configured to be connected to the expansion link part 460 to move along the direction in which the expansion link part 460 extends at the time of the operation of the second driving part 500 and a support member 444 configured to extend laterally from the moving member 442 to support a wheel of the bicycle.

Describing the movement of the loading part 440, the expansion link part 460 is configured as a lead screw and may be screw-connected to one side end of the moving member 442 by penetrating through the moving member 442. That is, the expansion link part 460 is configured as the lead screw and the one side end of the moving member 442 is configured as a lead nut into which a lead screw is inserted so as to be screw-connected to each other, such that when the expansion link part 460 rotates, the moving member 442 moves laterally over a thread of the expansion link part 460 configured as the lead screw.

However, according to the exemplary embodiment of the present invention, since the loading part 440 may be configured in a pair to be symmetrical to each other, the expansion link part 460 configured as the lead screw may perform an operation of making the pair of loading parts 440 approach or far away from each other even though the expansion link part 460 rotates in one direction by making directions of both threads be opposite to each other based on a center in a length direction.

The support member 444 is a portion to which the wheel of the bicycle is touched and an upper end surface thereof is formed to be bent to prevent the wheel of the bicycle from separating and may firmly fix the wheel of the bicycle to the support member 440 by a separate fixing member.

Meanwhile, as illustrated in FIG. 7, the expansion rail 420 is provided with a guide groove 422 along the extending direction and the support member 444 may be provided with a sliding part 446 configured to be inserted into the guide groove 422 and thus slidably move along the guide groove 422. By doing so, the guide groove 422 formed in the expansion rail 420 is configured to have the sliding part 446 formed in the support member 444 inserted thereinto to prevent the support member 444 from separating from the expansion rail 420 and perform the smooth sliding moving operation.

As such, the expansion support part 400 is expandably deployed to the side of the carrier part 200 by the second driving part 500 to load the bicycle.

For this purpose, the second driving part 500 may include a second motor part 520 configured to transfer rotation power and a rotation part 540 configured to extend laterally from the second motor part 520 to be connected to the expansion link part 460 and rotate in the front and rear direction at the time of the operation of the second motor part 520 to transfer the rotation power to the expansion link part 460.

In this configuration, the second motor part 520 may be adjacently installed to the expansion link part 460 and the second motor part 520 is provided with the rotation part 540 rotating in the front and rear direction at the time of the transfer of power. The rotating part 540 is connected to the expansion link part 460 to move the loading part 440 depending on the rotation of the expansion link part 460 when the second motor part 520 is operated.

The expansion link part 460 may be provided with a rotation connection part 465 connected to the rotation part 540 to receive the rotation power of the second motor part 520. For example, the rotation part 540 of the second driving part 500 and the rotation connection part 465 of the expansion link part 460 are provided with a gear mutually meshed with an outer circumferential surface to smoothly transfer the rotation power of the second motor part 520 to the expansion link part 460 and perform the rotation of the expansion link part 460 as much as the controlled RPM of the second motor part 520.

According to the exemplary embodiment of the present invention, the carrier part 200 is drawn out or received from or in the bumper back beam 10 and the carrier part 200 is configured to be drawn out and then be tilted at a predetermined angle.

Figure 8:
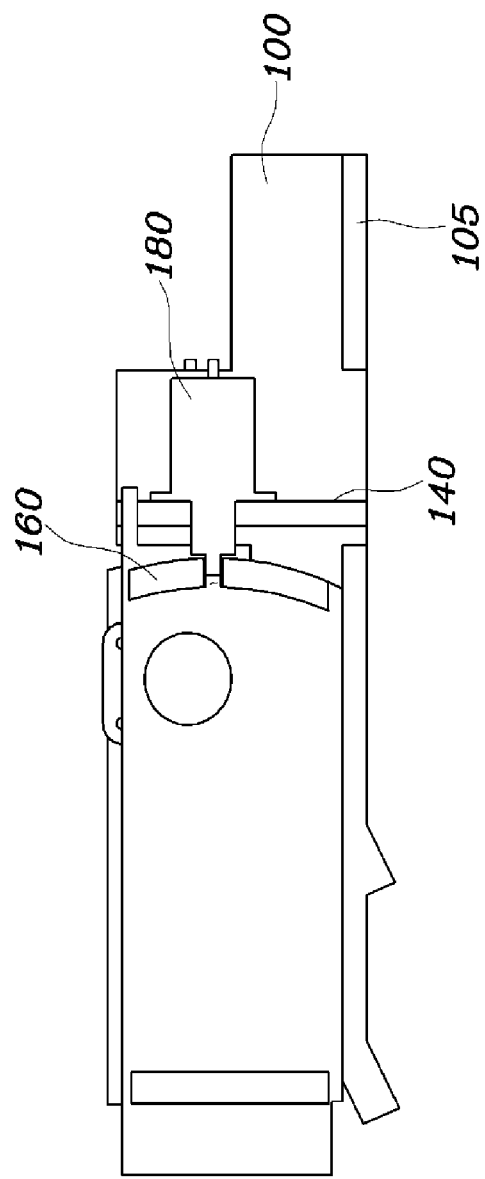

For this purpose, as illustrated in FIG. 8, the guide rail 100 is provided with a fixing bracket 140 configured to be fixedly installed to a rear end portion thereof and a tilting bracket 160 configured to be positioned at a rear portion of the fixing bracket 140 so as to be rotatably installed at the bumper back beam 10, such that the carrier part 200 performs the tilting operation along with the tilting bracket 160 by the rotation of the tilting bracket 160 in the state in which the carrier part 200 is completely drawn out.

In addition, the fixing bracket 140 is provided with a second solenoid part 180 configured to be selectively connected to the tilting bracket 160 to selectively permit the rotation operation of the tilting bracket 160. The second solenoid part 180 is connected to the tilting bracket 160 at ordinary times to restrict the rotation and releases the connection with the tilting bracket 160 in the state in which the carrier part 200 is completely drawn out, such that the tilting bracket 160 rotates along with the carrier part 200.

That is, as illustrated in FIG. 8, the tilting bracket 160 is rotatably installed at the bumper back beam 10 to rotate by a predetermined angle downward from the rear portion of the fixing bracket 140 and thus the carrier part 200 performs the tilting operation.

Here, at the time of the tilting operation of the carrier part 200, a gas lifter A decelerating the rotation speed of the carrier part 200 may be applied.

Figure 9:
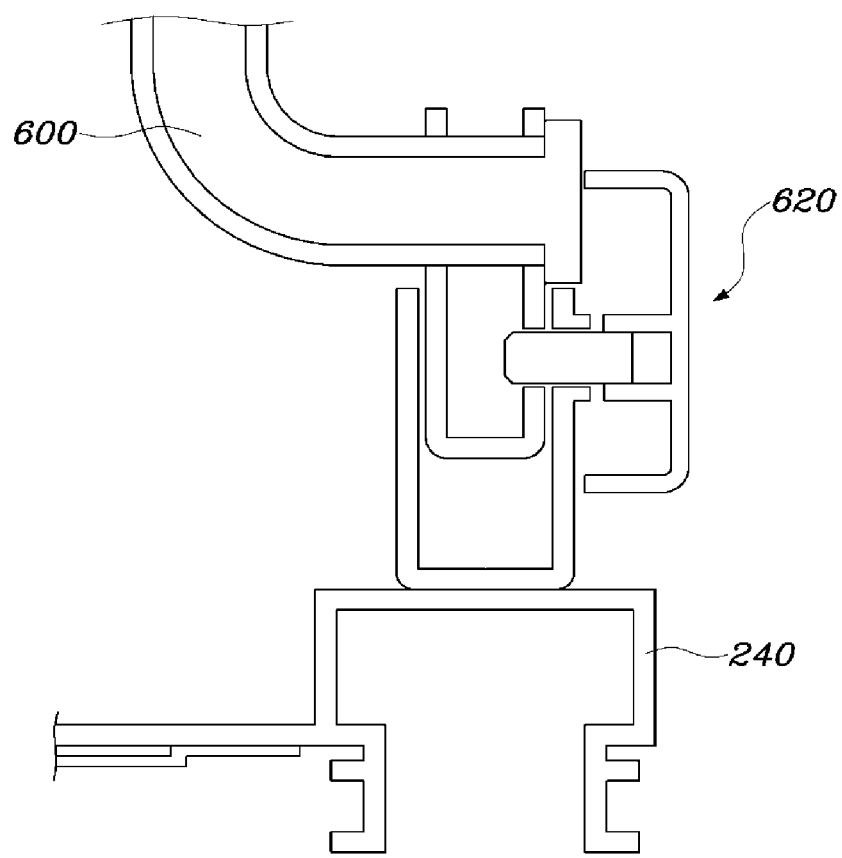

Meanwhile, as illustrated in FIG. 9, the side portion 240 of the carrier part 200 may be rotatably provided with a fixing bar 600 and may be provided with a fixing member 620 configured to fix the rotation position of the fixing bar 600.

The fixing bar 600 is a member for fixing the bicycle loaded at the carrier part 200 and a bicycle may be fixed to the fixing bar 600 by using a separate clamp mechanism. The fixing bar 600 is folded at an upper side of the side portion 240 of the carrier part 200 and rotates upward when the bicycle needs to be loaded and then is fixed to a body of the bicycle loaded at the carrier part 200 to more firmly fix the loaded bicycle.

When the fixing bar 600 is installed at the side portion 240 of the carrier part 200, a separate solenoid is used or various position fixing members are used to fix the rotating state. For example, as the fixing member 620 fixing the rotation position of the fixing bar 600, various members such as a locking lever, a latch apparatus, and a solenoid may be applied and the fixing bar 600 may be configured to automatically rotate by using the motor.

Describing the operation of the bicycle carrier apparatus for a vehicle according to the exemplary embodiment of the present invention as described above, the carrier part 200 is received in the bumper back beam 10 at ordinary times so as not to be exposed to the outside. When the bicycle needs to be loaded in this state, the first driving part 300 is operated by manipulating a separate switch. Here, the switch may be installed at the tail gate or a driver's seat.

By doing so, when the first driving part 300 is operated, the moving link part 340 rotates by the rotation power of the first motor part 320 and as the pinion gear 345 rotates, the carrier part 200 moves in the front and rear direction over the rack gear 105 of the guide rail 100. Here, the first solenoid part 120 is operated along with the first driving part 300 to separate from the carrier part 200 and permit the front and rear movement of the carrier part 200.

By doing so, when the carrier part 200 is completely drawn out from the bumper back beam 10, the second driving part 500 is operated to perform the expansion deployment operation of the expansion support part 400.

That is, as the second motor part 520 is operated, the rotation part 540 rotates and the rotation operation of the expansion link part 460 is performed by the rotation connection part 465 connected to the rotation part 540. Therefore, the moving member 442 of the loading part 440 connected to the expansion link part 460 moves along the extending direction of the expansion rail 420 and the moving member 442 moves to expandably deploy laterally the support member 444 to which the wheel of the bicycle is supported.

Meanwhile, when the carrier part 200 is completely drawn out from the bumper back beam 10, it is determined whether the carrier part 200 is tilted. That is, when the second solenoid part 180 provided at the fixed bracket 140 is operated and is separated from the tilting bracket 160, the rotation of the tilting bracket 160 is permitted and as the tilting bracket 160 rotates, the tilting bracket 160 rotates along with the carrier part 200 to perform the tilting operation.

According to the carrier apparatus for a vehicle having the above-mentioned structure, it is possible to maintain the appearance design and improve the convenience, by installing the bicycle carrier at the bumper back beam 10 of the rear portion of the vehicle to prevent the bicycle carrier from being exposed to the outside at ordinary times and automatically drawing out the bicycle carrier from the bumper back beam 10 at the time of the loading of the bicycle to load the bicycle.

Further, it is possible to more facilitate a use of a rear loading space by drawing out the bicycle carrier and tilting the bicycle carrier and improve marketability by expandably deploying the bicycle loading part for loading the bicycle in both directions.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A bicycle carrier apparatus for a vehicle, comprising:
   guide rails disposed at a lower portion of a bumper back beam while being symmetrical to each other and extendedly formed in front and rear directions;
   a carrier part provided with a panel part and provided with side portions extending from both sides of the panel part to the guide rails to slidably move in the front and rear directions along the guide rails;
   a first driving part installed at a front end portion of the carrier part and connected to the guide rails to move the carrier part in the front and rear directions along the guide rails;
   an expansion support part installed between the side portions of the carrier part to be expandably deployed laterally and support a loaded bicycle; and
   a second driving part installed at the carrier part and connected to the expansion support part to expandably deploy the expansion support part.

2. The bicycle carrier apparatus for the vehicle of claim 1, wherein the first driving part includes:
   a first motor part transferring rotation power; and
   a moving link part extending from the first motor part toward the side portions of the carrier, wherein extending ends of the moving link part is engaged to the guide rails, and the first motor part slidably moves the carrier part in the front and rear directions along the guide rails when the first motor part is operated.

3. The bicycle carrier apparatus for the vehicle of claim 2, wherein the extending ends of the moving link part are provided with pinion gears and the guide rails are provided with rack gears extending in the front and rear directions and meshed with the pinion gears.

4. The bicycle carrier apparatus for the vehicle of claim 1, wherein the expansion support part includes:
   an expansion rail extending to cross the side portions of the carrier part to be fixed to the side portions;
   a loading part slidably moving along the expansion rail; and
   an expansion link part extending in parallel with the expansion rail, being movably connected along a direction in which the loading part extends, and being connected to the second driving part to move the loading part along the expansion rail at a time of the operation of the second driving part.

5. The bicycle carrier apparatus for the vehicle of claim 4, wherein the loading part includes a moving member connected to the expansion link part to move along a direction in which the expansion link part extends at a time of the operation of the second driving part and a support member extending laterally from the moving member to support a wheel of the bicycle.

6. The bicycle carrier apparatus for the vehicle of claim 5, wherein the expansion link part is configured as a lead screw and is screw-connected to one side end of the moving member by penetrating through the moving member.

7. The bicycle carrier apparatus for the vehicle of claim 5, wherein the expansion rail is provided with a guide groove along the extending direction and the support member is provided with a sliding part inserted into the guide groove to slidably move along the guide groove.

8. The bicycle carrier apparatus for the vehicle of claim 4, wherein the second driving part includes:
a second motor part transferring rotation power; and
a rotation part extending laterally from the second motor part to be connected to the expansion link part and rotate in the front and rear directions at a time of the operation of the second motor part to transfer the rotation power to the expansion link part.

9. The bicycle carrier apparatus for the vehicle of claim 8, wherein the expansion link part is provided with a rotation connection part connected to the rotation part to receive the rotation power of the second motor part.

10. The bicycle carrier apparatus for the vehicle of claim 9, wherein the rotation part of the second driving part and the rotation connection part of the expansion link part are provided with a gear mutually meshed with an outer circumferential surface.

11. The bicycle carrier apparatus for the vehicle of claim 1, wherein the guide rails are provided with first solenoid parts selectively connected to the side portions of the carrier part to selectively permit the sliding movement of the carrier part.

12. The bicycle carrier apparatus for the vehicle of claim 1, wherein the guide rails are provided with a fixing bracket fixedly installed to a rear end portion thereof and a tilting bracket positioned at a rear portion of the fixing bracket to be rotatably installed at the bumper back beam.

13. The bicycle carrier apparatus for the vehicle of claim 12, wherein the fixing bracket is provided with a second solenoid part selectively connected to the tilting bracket to selectively permit the rotation operation of the tilting bracket.

14. The bicycle carrier apparatus for the vehicle of claim 1, wherein the side portion of the carrier part is rotatably provided with a fixing bar and is provided with a fixing member fixing the rotation position of the fixing bar.

* * * * *